(12) United States Patent
Blakley

(10) Patent No.: US 6,634,784 B2
(45) Date of Patent: Oct. 21, 2003

(54) MIXING IMPELLER DEVICE AND METHOD

(75) Inventor: Robert A. Blakley, Rochester, NY (US)

(73) Assignee: SPX Corporation, Charlotte, NC (US)

(*) Notice: Subject to any disclaimer, the term of this patent is extended or adjusted under 35 U.S.C. 154(b) by 83 days.

(21) Appl. No.: 09/930,996

(22) Filed: Aug. 17, 2001

(65) Prior Publication Data

US 2003/0035341 A1 Feb. 20, 2003

(51) Int. Cl.[7] .................................................. B01F 7/22
(52) U.S. Cl. ................ 366/330.2; 366/331; 416/200 R; 416/214 R; 403/300; 403/337
(58) Field of Search .................... 366/330.1–330.7, 366/331; 416/200 R, 200 A, 234, 212 R, 212 A, 214 R, 214 A, 244 R, 244 A, 244 B; 403/300, 305, 308, 337

(56) References Cited

U.S. PATENT DOCUMENTS

| 57,771 | A | * | 9/1866 | Roach |
| 120,097 | A | * | 10/1871 | Potter |
| 181,679 | A | * | 8/1876 | Hill |
| 645,354 | A | * | 3/1900 | Emrich |
| 950,990 | A | * | 3/1910 | Boyd |
| 1,223,321 | A | * | 4/1917 | Curtiss |
| 1,246,023 | A | * | 11/1917 | Kirkham |
| 1,288,136 | A | * | 12/1918 | Neuteboom |
| 1,404,298 | A | * | 1/1922 | Jacobs |
| 1,825,184 | A | | 9/1931 | Glanschnig |
| 1,835,913 | A | * | 12/1931 | Squires |
| 1,959,712 | A | * | 5/1934 | Flowers |
| 2,509,096 | A | | 5/1950 | Fulton, Jr. et al. |
| 2,669,471 | A | * | 2/1954 | Breslow |
| 3,097,066 | A | * | 7/1963 | Logue |
| 5,951,162 | A | | 9/1999 | Weetman et al. ........ 366/328.1 |

FOREIGN PATENT DOCUMENTS

| CH | 614134 | 11/1979 |
| DE | 562894 | 10/1932 |
| DE | 3427789 | 1/1986 |
| GB | 305473 | 3/1930 |

OTHER PUBLICATIONS

International Search Report dated Mar. 12, 2003 for PCT/US02/26268.

* cited by examiner

Primary Examiner—Charles E. Cooley
Assistant Examiner—David Sorkin
(74) Attorney, Agent, or Firm—Baker & Hostetler LLP

(57) ABSTRACT

An impeller assembly is mountable onto a rotatable shaft that has a flange extending radially from the shaft and rotating with the shaft. The impeller has at least one blade pair member having two opposed blades and central hub portion having a hole therethrough with an inner diameter at least as large as the outer diameter of the shaft, a plurality of corresponding mounting holes provided in each of the flange and the blade pairs, and a plurality of bolts for fastening the blade pair to the flange via the mounting hole.

5 Claims, 5 Drawing Sheets

MIXING IMPELLER DEVICE AND METHOD

FIELD OF THE INVENTION

The present invention relates generally to a mixing impeller device and method. More particularly, the present invention relates to an impeller for mixing and blending materials such as gases, liquids and liquid suspensions.

BACKGROUND OF THE INVENTION

Mixing and blending applications, in particular the mixing and blending of liquids, liquid suspensions and gases, are often constrained by the diameter of the tank in which the mixing is being carried out and by the diameter of the impeller. Some high solidity impeller designs (or "gas foils") compensate for the aforementioned constraints by using impellers with three or four blades each having a large projected area. For example, it is known for existing high solidity impeller blades to occupy 80% of their total swept area. In addition, some existing impeller designs use impeller diameters which are typically 45% to 65% of the tank diameter. For a vessel of 240" (20 feet) in diameter, the impeller diameter is approximately 120" (10 feet) in diameter depending on service requirements, and the blades are approximately 60" long and at least 38" wide.

The impeller blades need to be inserted through a manway in the vessel for installation. In some covered mixing vessels, manways are commonly 24" in size and can pass impeller blades of up to 23" in width at best. Therefore, in order to insert larger blades, users either have to install an oversized manway, (40" in size for a 240" diameter tank), or the blades must be supplied in a longitudinally split configuration and then assembled inside the vessel. Splitting the impeller blades is an expensive operation, especially for blades having a rounded, leading edge, twist and curvature. In addition, multiple bolts are required along with match marking to assure proper, gap free re-assembly. This process can be very difficult and time consuming because the inner and outer blade components must be aligned correctly so that the impeller balance and blade geometry will not be compromised.

Further, some blades of known impeller design utilize a "blade to ear" bolted connection for providing torque transmission, thrust reaction and blade support, in which the blades are each attached to an ear extending from the shaft. The blades use symmetrical bolt patterns of 4, 5, 7 or more bolts to attach the blade to the ear of the hub. This connection must be carefully designed, manufactured and assembled to assure problem free installation of the blades.

Also, known impeller designs usually provide 3 to 4 blades per impeller. Thus, 12 to 28 bolts are required for blade attachment, and alloy bolts are often required. Alloy bolts are expensive and, depending on the material, of limited availability. Many users require the use of positive locking of impeller bolts and hardware through the use of locking plates, double nuts and/or safety wire, increasing the total cost of each bolt. Due to the large quantity of bolts, it is usually not practical for the end user to retighten the impeller hardware after the initial period of operation, which can cause a loss of pre-load and premature failure of the bolted connection.

Accordingly, it is desirable to provide a high solidity impeller for mixing gas and liquid materials that offers improved reliability, reduced cost and ease of installation.

SUMMARY OF THE INVENTION

The present invention relates to impellers and impeller systems for mixing and blending applications. The invention is especially suitable for use in applications where the vessels are closed and are relatively large in diameter.

In one aspect, the invention provides an impeller assembly that is mountable onto a rotatable shaft that has a flange extending radially from the shaft and rotating with the shaft. At least one blade pair member has two opposed blades and a central hub portion having a hole therethrough with an inner diameter at least as large as the outer diameter of the shaft. A plurality of corresponding mounting holes is provided in each of the flange and the blade pairs, and a plurality of bolts for fastening the blade pair to the flange via the mounting hole is provided.

In another aspect of the invention, the impeller assembly further comprises at least one additional blade pair. The blade pairs are stacked onto one another, so that the blades extend radially at angular intervals to each other. The mounting holes align so that the bolts fasten all of the blade pairs to the flange.

In a third aspect of the invention, the flange has a frictional fit key member and is releasably frictionally fit at a location along the length of the shaft.

In yet another aspect, the invention provides a method for mounting an impeller assembly onto a rotatable shaft having a flange radially extending from the shaft. The method comprises the steps of inserting at least one member that has two opposed blades and a central hub portion that has a hole therethrough with an inner diameter at least as large the outer diameter of the shaft onto the shaft and into contact with the flange. The method provides for fastening the blade pair member to the flange so that it rotates with the shaft.

In a further aspect of the invention, the method additionally comprises the step of fastening a second blade pair member having two opposed blades and a central hub portion having a hole therethrough with an inner diameter at least as large as the outer diameter of the shaft onto the shaft in a stacked fashion onto the at least one blade pair member.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Figure 1:
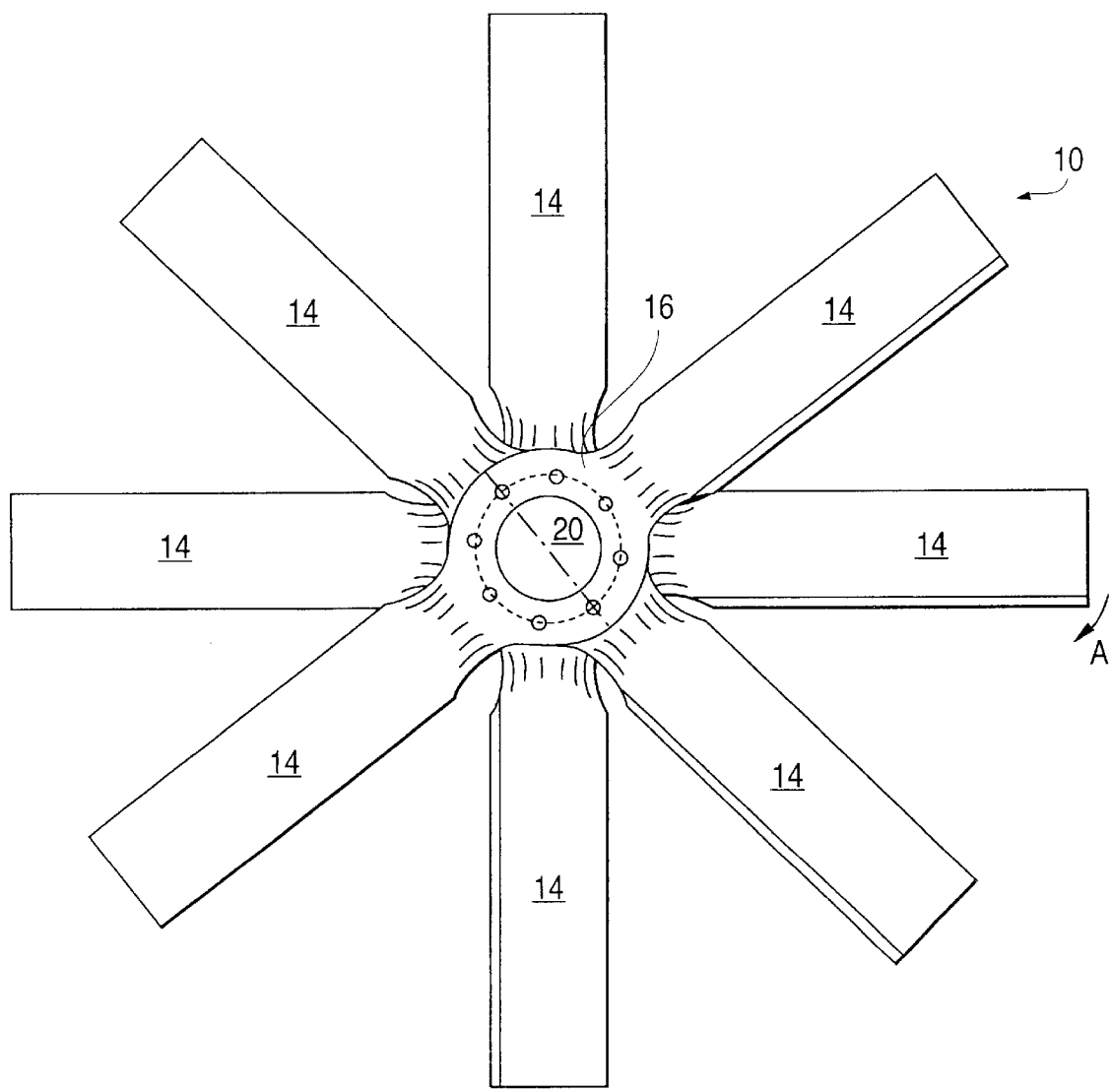
FIG. 1 is a plan view of an eight bladed impeller using four one-piece blade pairs in accordance with the present invention.

Referring now to the figures wherein like reference numerals indicate like elements, FIGS. 1–5 illustrate presently preferred embodiments of an eight bladed gas foil impeller. While in the embodiment depicted the impeller is used for gas and/or liquid handling in agitated vessels, it should be understood that the present invention is not limited in its application to the blending and mixing of gases and/or liquids.

Figure 2:
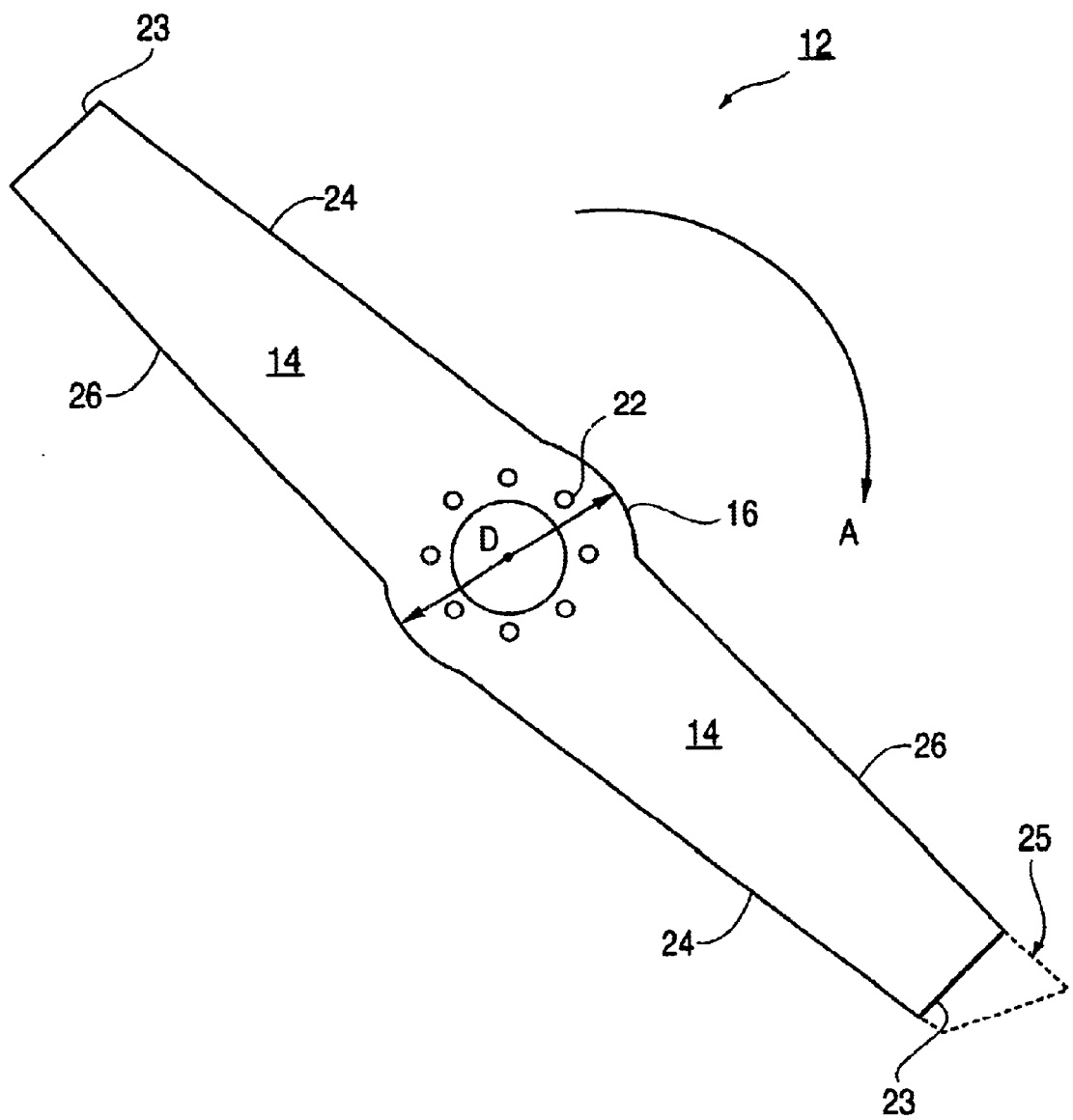
FIG. 2 is plan view of a one-piece blade pair having a driver disc hub.
Figure 3:
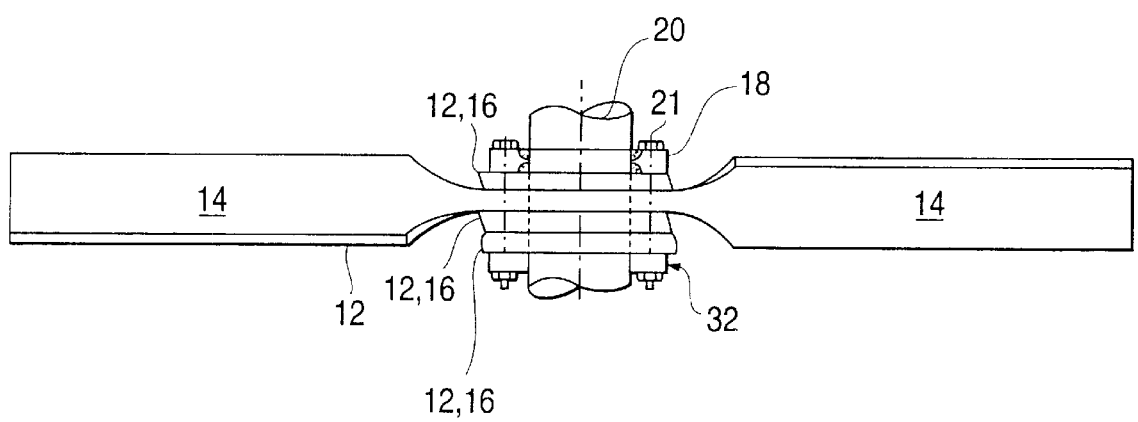
FIG. 3 is a side cutaway view of the impeller of FIG. 1 showing four blade pairs mounted to a shaft.

Referring to FIGS. 1 and 2, there is shown a mixing impeller 10 having four one-piece blade pairs 12 for a total of eight blades 14. To form the blade pairs 12, individual blades 14 are welded directly to a drive hub 16, 180° apart. As seen in FIG. 3, each drive hub 16 bolts up in a stacked fashion to a rigid flange 18 which is welded to a shaft 20. This eliminates the normal blade-to-ear bolted connection of present impeller design and can thus provide improved torque transmission, thrust reaction and support of the blade weight through the attachment of the stacked driver hubs 16 to the welded shaft flange 18.

The driver hubs 16 are attached to the welded shaft flange 18 by eight alloy bolts 21 through bolt holes 22 in the hubs 16. This bolt attachment provides for angular indexing of the blades 14 to maintain proper tip-to-tip spacing and can simplify the field installation. A reduction in the number of bolts compared to ear designs is thus possible and may be desirable due to the significant cost of alloy bolts, their limited availability, and the fact that many applications require positive locking of the bolts by means of locking plates, double nuts and/or safety wire.

In the embodiment of FIG. 3, the connection of the blades 14 to the shaft 20 is via the one-piece blade pairs 12 where the driver hubs 16 are stacked and bolted to the welded shaft flange 18. This connection is not prone to fretting, corrosion, or seizing to the shaft 20 due to material "pick-up." This connection also is not dependent upon tight tolerancing to maintain performance. Therefore, the impeller 10 of the present invention can provide a more durable and more reliable shaft/blade connection than prior designs.

The aforementioned blade/shaft connection is also beneficial because the present design is based on a strength level equal to that of the shaft. Consequently it can offer improved reliability if the impeller 10 is overloaded because the blades 14 deflect before the overload forces damage the shaft 20. In addition, the connection provides for torque transmission primarily through friction between adjacent blade pairs 12 being compressed together and towards the flange 18, rather than primarily through tensile loading/pre-load in bolts. This avoids a problem in some present impeller designs, where the bolts which connect the blades to the shaft via an ear experience what is known as load sharing where some bolts may experience significantly higher loads than others. This occurrence contributes to these present impellers having a propensity for selective bolt failure.

A benefit of the one-piece blade pair design 12 in combination with the welded shaft flange 18 design is that it uniformly distributes loads to all bolts 21, and using the one-piece design where two blades 14 are incorporated, each blade 14 is subject to 50% of the load is present in four-blade designs.

Referring to FIG. 2, the blades 14 are shown connected to the driver hub 16 to form the one-piece blade pairs 12. When installed, the blade pair 12 rotates about its central axis, for example, in the direction A. Each of the blades 14 may be identical and formed in a press. The blades 14 have a tip 23 and a leading edge 24 and a trailing edge 26. An optional tip shape 25 is shown in dotted lines. When the blades 14 are installed, the tips 23 lie along the circumference of a circle defining the swept diameter of the impeller 10. The leading edge 24 may be straight as shown in FIG. 2 or curved.

The blades 14 of the pairs are welded directly to the driver hub 16, eliminating the need for many bolts and machined holes in impeller shafts and blades. The blades 14 are air foils having camber and twist except at the hub end where they are attached to the driver hub 16. Upward and/or downward pumping is easily accomplished as a result of the blades 14 being welded to the driver hub 16. Accordingly, when the impeller 10 rotated in a clockwise direction A, as shown, axial flow is produced in the downward direction (downward pumping) in the liquid or liquid suspension in the mixing vessel. Alternatively, if the mixer drive allows reversed rotation, the blades 14 can be selectively installed and the drive reversed to change the flow direction without requiring additional or new parts.

Mixing impellers operate in an open flow field which leads to asymmetries in suction side velocities and direction. As shown in FIG. 2, the present invention utilizes a blade 14 that is approximately only 30% of the width of some presently known impeller blades. In addition, the increase in the blade number to eight (compared to having fewer blades), reduces the lift and drag on each blade, reducing the need for larger shafts and larger drives.

The one-piece blade pair 12, as shown in FIG. 2, has a shape intended to allow nesting with little material scrap. In a preferred embodiment, the blade 14 width is equal to 15% of the impeller 10 diameter, enabling the one-piece blade pair 12 to easily fit through a standard manway. In addition, the driver hub diameter D is approximately 18% to 20% of the total impeller diameter. For example, an impeller having a diameter of 120" would have a driver hub diameter of approximately 22.8". These dimensions enable the one-piece blade pair 12 in this example to pass through the standard manway and be adequate to attach to flange designs up to 20" pipe. Shafts of smaller diameter, particularly those suited for speed and shaft strength criteria, typically range from 5" to 8" in diameter, are also well suited for operation with the one-piece design. Therefore, installation of the impeller 10 is simplified due the impeller geometry. The blade pairs are easily moved through standard manways without requiring the user to split the blades for entry through the manway and then reassemble them inside the mixing vessels.

The blade pairs 12 are easily shifted up the shaft due to a clearance between the inner diameter of the hole in the driver hub 16 and the outer diameter of the shaft 20. Also, the one-piece blade pair design can be implemented using only eight bolts to attach the eight bladed assembly to the shaft via bolt holes 22.

FIG. 3 shows one preferred embodiment of the invention, and illustrates how the four blade pairs 12 are attached to the shaft 20. In the embodiment shown in FIG. 3, a shaft flange 18 is welded to the shaft 20. The flange 18 may also be referred to as a driver disk. Bolts 21 extend through respective aligned holes 22 in the flange 18, blade pairs 14, and a clamp plate 30 to hold the blade pairs 12 so they rotate together with the flange 18 and the shaft 20. In this embodiment, eight bolts 21 are used to attach the blade pairs to 14 to the hub 18. The clamp plate 32 may be a single disk-shaped clamp plate, or may be a plurality of individual clamp plates, one associated with each bolt 21. Alternatively, the clamp plate may be a suitable type of washer or may be omitted entirely. If a clamp plate 32 is used, the clamp plate 32 can provide for a uniform distribution of the bolt clamp load. For applications that require precision levels of balancing in either a single plane ("static") or in two planes ("dynamic"), an alignment pin (not shown) may be inserted through matching holes in the elements 18, 14, and 32 for repeatability.

The flange 18 is usually machined in order to produce squareness and concentricity to the shaft 20 centerline as well as achieving the necessary flatness assuring a good bolted connection to the blade pairs 12. The use of eight bolts 21 attaching the driver disk 18 to the blade pairs 12 provides for angular indexing of the blades to maintain proper tip-to-tip spacing as well as simplifying field installation.

Figure 4:
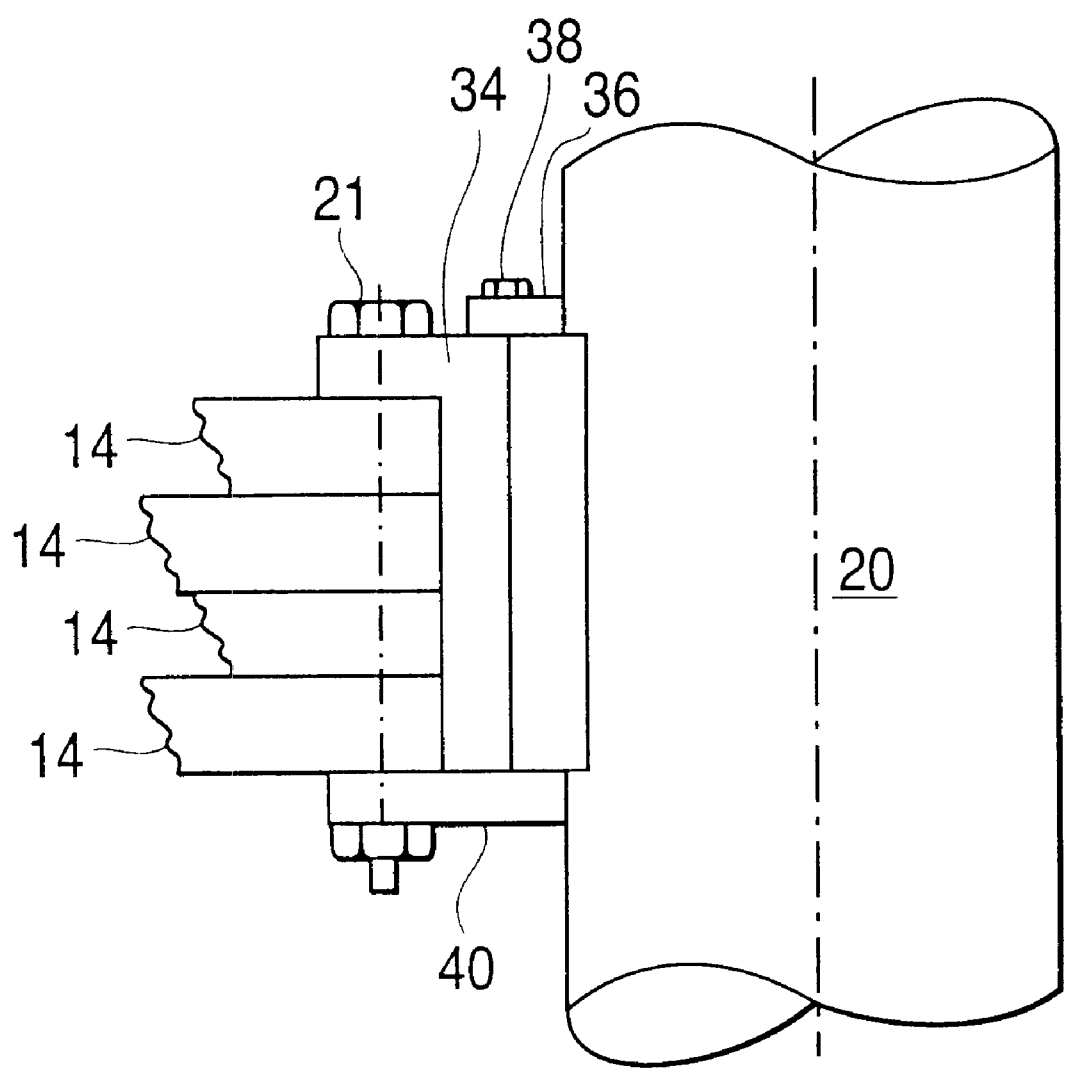
FIG. 4 is a side view of an embodiment having a sliding fit hub with an integral flange in accordance with the present invention.

FIG. 4 illustrates another embodiment using a sliding fit hub 34 that uses a hook key 36 that is tightened against the hub 34 to provide a frictional fit against the shaft 20. The key 36 is a wedge-shaped element and has an angled surface that mates against an angled surface inside the hub 34, and tightening of a bolt 38 that extends through the key 36 and is threaded into the hub 34 urges the key 36 downwards, and hence radially inwards, to provide a tight frictional grip against the circumference of the shaft 20. A lower ring 40 is bolted to the sliding fit hub 34 as shown via the bolts 21 to retain the blade pairs 12. The sliding fit hub 34 arrangement permits the impellers to be mounted anywhere along the length of a shaft and permits, therefore, for vertical adjustment of the location of the impellers, as desired.

Figure 5:
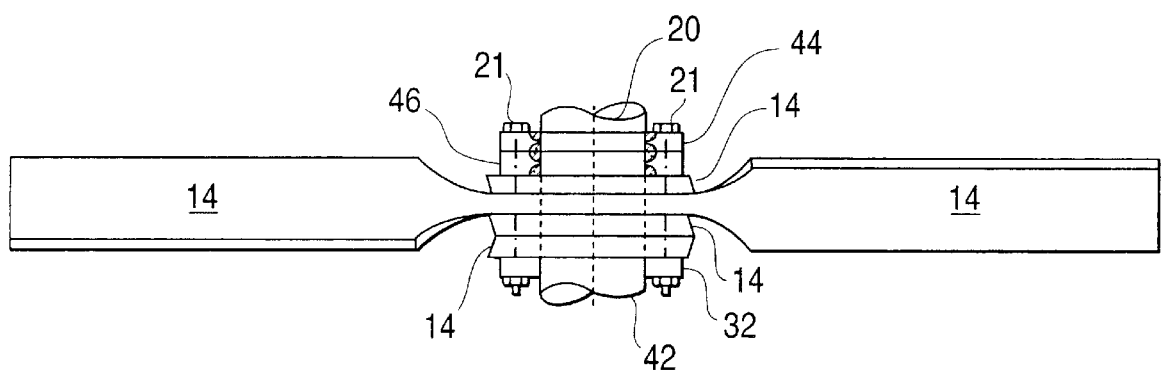
FIG. 5 is a side view of an impeller in accordance with an embodiment where two shafts are attached by flanges.

FIG. 5 illustrates another embodiment of the invention, which provides a combined shaft coupling and impeller attachment. In this embodiment, an upper shaft 20 has a flange 44, and a lower shaft 42 has a flange 46. Each of these flanges is welded at the end of its respective shaft. In the arrangement shown in FIG. 5, bolts 21 are used extending through corresponding aligned holes 22 in the flange 44, the flange 46, the blade pairs 12, and a retaining clamp plate 32 to secure all these elements together so that they rotate together with the shafts 20 and 42. In this way, the shafts 20 and 42 are connected to each other, and the blade pairs 12 are also mounted at this location.

The above description and drawings are only illustrative of preferred embodiments which achieve the objects, features, and advantages of the present invention, and is not intended that the present invention be limited thereto. Any modification of the present invention which comes within the spirit and scope of the following claims is considered to be part of the present invention.

What is claimed is:

1. A method for mounting an impeller assembly onto a rotatable shaft having flange radially extending from the shaft, the method comprising the steps of:

inserting at least one member having two opposed blades and a central hub portion having a hole therethrough with an inner diameter at least as large the outer diameter of the shaft onto the shaft and into contact with the flange; and fastening the blade pair member to the flange so that it rotates with the shaft, wherein the shaft is a first shaft and the flange is a first flange located at the end of the first shaft and wherein the fastening step includes the step of connecting the first flange to a second flange that is located at the end of a second shaft.

2. A method according to claim 1, wherein the step of fastening the blade pair member includes the step of bolting the blade pair member to the flange with a plurality of bolts.

3. A method according to claim 1, further comprising the step of fastening a second blade pair member having two opposed blades and a central hub portion having a hole therethrough with an inner diameter at least as large as the outer diameter of the shaft onto the shaft in a stacked fashion onto the at least one blade pair member.

4. A method according to claim 3, wherein a number of blade pairs is four, and the four blade pairs are stacked onto one another and fastened to the flange.

5. A method according to claim 4, wherein the blade pairs are spaced at equal angular intervals.

* * * * *